United States Patent [19]

Ackerman et al.

[11] Patent Number: 4,476,198
[45] Date of Patent: Oct. 9, 1984

[54] SOLID OXIDE FUEL CELL HAVING MONOLITHIC CORE

[75] Inventors: John P. Ackerman, Downers Grove; John E. Young, Woodridge, both of Ill.

[73] Assignee: The United States of America as represented by the United States Department of Energy, Washington, D.C.

[21] Appl. No.: 541,213

[22] Filed: Oct. 12, 1983

[51] Int. Cl.³ .............................................. H01M 8/10
[52] U.S. Cl. ...................................... 429/32; 429/33; 429/34
[58] Field of Search ............................. 429/32, 33, 34

[56] References Cited

U.S. PATENT DOCUMENTS

| | | | |
|---|---|---|---|
| 3,558,360 | 1/1971 | Sverdrup et al. | 136/86 |
| 3,617,385 | 11/1971 | Gray | 136/86 |
| 3,754,995 | 8/1973 | Kleinschmager | 136/86 R |
| 3,834,943 | 9/1974 | Van den Beighe et al. | 136/86 D |
| 3,905,775 | 9/1975 | Sowards et al. | 23/288 FC |
| 4,142,024 | 2/1979 | Van den Beighe et al. | 429/41 |
| 4,195,119 | 3/1980 | Kummer | 429/38 |
| 4,248,941 | 2/1981 | Louis | 429/13 |
| 4,317,867 | 3/1982 | Warzowski | 429/42 |
| 4,324,844 | 4/1982 | Kothmann | 429/34 |

Primary Examiner—Charles F. LeFevour
Attorney, Agent, or Firm—Charles F. Lind; Hugh W. Glenn; Michael F. Esposito

[57] ABSTRACT

A solid oxide fuel cell for electrochemically combining fuel and oxidant for generating galvanic output, wherein the cell core has an array of electrolyte and interconnect walls that are substantially devoid of any composite inert materials for support. Instead, the core is monolithic, where each electrolyte wall consists of thin layers of cathode and anode materials sandwiching a thin layer of electrolyte material therebetween, and each interconnect wall consists of thin layers of the cathode and anode materials sandwiching a thin layer of interconnect material therebetween. The electrolyte walls are arranged and backfolded between adjacent interconnect walls operable to define a plurality of core passageways alternately arranged where the inside faces thereof have only the anode material or only the cathode material exposed. Means direct the fuel to the anode-exposed core passageways and means direct the oxidant to the cathode-exposed core passageway; and means also direct the galvanic output to an exterior circuit. Each layer of the electrolyte and interconnect materials is of the order of 0.002–0.01 cm thick; and each layer of the cathode and anode materials is of the order of 0.002–0.05 cm thick.

18 Claims, 9 Drawing Figures

SOLID OXIDE FUEL CELL HAVING MONOLITHIC CORE

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

A fuel cell is basically a galvanic energy conversion device that chemically converts hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperatures of the fuel cell is between 700° and 1,100° C.

The hydrogen reaction on the anode (the negative electrode) with oxide ions generates water with the release of electrons; and the oxygen reaction on the cathode with the electrons effectively forms the oxide ions. Electrons flow from the anode through the appropriate external load to the cathode, and the circuit is closed internally by the transport of oxide ions through the electrolyte. The electrolyte, however, electrically insulates the cathode and anode from one another. Thus, the reactions are at the:

cathode $\frac{1}{2}O_2 + 2e^- \rightarrow O^{-2}$ (1)

anode $H_2 + O^{-2} \rightarrow H_2O + 2e^-$. (2)

The overall cell reaction is $H_2 + \frac{1}{2}O_2 \rightarrow H_2O$. (3)

In addition to hydrogen, the fuel can be derived from a hydrocarbon such as methane ($CH_4$) reformed by exposure to steam at 350° to 800° C., which initially produces carbon monoxide (CO) and three molecules of hydrogen. As hydrogen is consumed, a shift reaction occurs as follows $CO + H_2O \rightarrow CO_2 + H_2$. (4)

The overall reaction of hydrocarbons is illustrated by $CH_4 + 2O_2 \rightarrow CO_2 + 2H_2O$. (5)

Inasmuch as the conversion is electrochemical, the thermal limitations of the Carnot cycle are circumvented; therefore efficiencies in the range of 50% fuel heat energy conversion to electrical output can be theoretically obtained. This is much higher than equivalent thermal engines utilizing the same fuel conversion, including even a conventional diesel powered engine.

The electrolyte isolates the fuel and oxidant gases from one another while yet provides a medium allowing the ionic transfer and voltage buildup across the electrolyte. The electrodes (cathode and anode) provide paths for the internal movement of electrical current within the fuel cell to the cell terminals, which also connect then with an external load. The voltage across each or cell is of the order of 0.7 volts maximum, so the individual cell must be placed in electrical series to obtain a useful voltage. A series connection is accomplished between adjacent cells with an interconnect material which isolates the fuel and oxidant gases from one another while yet electronically connects the anode of one cell to the cathode of an adjoining cell. As the active electrochemical generation of electricity takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrode also limits the cell performance. Fuel and oxidant must diffuse at right angles from the flow in the respective passageways through the electrolyte to the reaction sites. The fuel and oxidant diffuse through the electrolyte and react at (or near) the three-phase boundary of the gases, the electrodes (anode or cathode), and electrolyte, whereat electrochemical consumption occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel in either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2 + CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2 + Y_2O_3$); and the anode would be layered over the electrolyte comprised, for example, of a cobalt yttria-stabilized zirconia cermet or mixture ($Co + ZrO_2 + Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

An alternate construction provides an electrical interconnect at a cordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred.

Moreover, the tube supports are nonproductive and heavy so that the power and energy densities suffer when compared to other forms of energy conversion, including even the liquid electrolyte fuel cells more commonly operated at lower temperatures.

SUMMMARY OF THE INVENTION

This invention provides an improved solid electrolyte or solid oxide fuel cell having a light weight, honeycomb core comprised of many small individual monolithically formed cells or passageways through which the fuel and the oxidant are passed for the electrochemical conversion of the same.

A basic object of this invention is to provide a monolithic honeycomb fuel cell core comprised solely and exclusively of the active anode, cathode, electrolyte and interconnect materials, and with no nonactive materials for support.

A more specific object of this invention is to provide a fuel cell having a monolithic honeycomb fuel core comprised solely and exclusively of either the anode and cathode materials sandwiching the electrolyte or the anode and cathode materials sandwiching the interconnect material, where the cells are thus otherwise devoid of nonactive materials for support.

A further object of this invention is to provide a monolithic core comprised solely and exclusively of the specific active materials including the anode, cathode, electrolyte and the interconnects; where corresponding portions of the core walls are fused into similar composite structures and where these portions are oriented in side by side alternately defined arrays of passageways suited to have the fuel and oxidant passed through the alternately adjacent passageways.

The anode, cathode, electrolyte and interconnect materials are selected and modified to comply with the required electrically conductive aspects of the cathode, anode, and interconnect, the ionic transport and electronic isolation aspect of the electrolyte, and the gas porosity requirement of the cathode and anode and the gas imperforate requirement of the electrolyte and interconnect. Likewise the structural integrity, thermal expansion and contraction ratios, and crystal integrity of the composite monolithic core are designed for the specific operational parameters of temperature, pressure, gas flow rates, voltage and current densities necessary to provide optimal efficiency.

In a preferred embodiment of the invention, the interconnects and the electrolyte layers are thin (0.002–0.01 cm) while the sandwiching cathode and anode layers are perhaps between the same thickness or even five times this (0.002–0.05 cm).

The monolithic core will provide for greatly increased power density, perhaps fifty times those of a conventional support tube type fuel cell, due to the increased active exposure areas of fuel and oxidant compared to the corresponding flow path volumes, and due further to reduced current path lengths having overall lower internal electrical resistant losses. The monolithic core eliminates all support structures other than the active materials themselves; and the anode, cathode, electrolyte and interconnect layers are quite thin, to reduce the fuel cell weight. As the defined fuel and oxidant passageways of the core are small, the material layers can be thin and yet self supporting over the small distances across the defined passageways. Conventional tube type support structures can be eliminated. Moreover, thin layers of the active materials are possible because of the shorter current paths required. The monolithic core design minimizes diffusion losses by eliminating the thick support tube entirely and by employing thin active electrodes.

RELATED COFILED APPLICATIONS AND INVENTIONS

The application Ser. No. 541,184 entitled "Method of Fabricating a Monolithic Core For a Solid Oxide Fuel Cell" cofiled herewith having Stanley A. Zwick and John P. Ackerman as joint inventors, discloses the repetitive and sequential application of deposits of each of the anode, cathode, electrolyte and interconnect materials onto itself for building up the interconnect and electrolyte core walls endwise of the walls or in line with the flow passageways defined by the walls. Each electrolyte and interconnect wall of the core consists respectively, of anode and cathode materials layered on the opposite sides of electrolyte material, or on the opposite sides of interconnect material. Each separate deposit of each separate material is made over the entire core cross section simultaneously, whereby complicated shapes or cross sections of the flow passageways for the fuel and oxidant can be made as simply as can regular or symmetrical overall cross sections be made.

The application Ser. No. 541,178 entitled "Integral Manifolding Structure For Fuel Cell Core Having Parallel Gas Flow" cofiled herewith having Joseph E. Herceg as sole inventor, discloses means for directing the fuel and oxidant gases to parallel flow passageways in the core. A core wall projects beyond the open ends of the defined core passageways and is disposed approximately midway between and parallel to the adjacent overlying and underlying interconnect walls to define manifold chambers therebetween on opposite sides of the wall. Each electrolyte wall defining the flow passageways is shaped to blend into and be connected to this wall in order to redirect the corresponding fuel and oxidant passageways to the respective manifold chambers either above or below this intermediate wall. Inlet and outlet connections are made to these separate manifold chambers respectively, for carrying the fuel and oxidant gases to the core, and for carrying their reaction products away from the core.

The application Ser. No. 541,177 entitled "Solid Oxide Fuel Cell Having Monolithic Cross Flow Core and Manifolding" cofiled herewith having Roger B. Poeppel and Joseph T. Dusek as joint inventors, discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

The application Ser. No. 541,176 entitled "Solid Oxide Fuel Cell Having Compound Cross Flow Gas Patterns" cofiled herewith having Anthony V. Fraioli as sole inventor, discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageways disposed normal to one another. This provides for the solid mechanical connection of the interconnect walls of adjacent tiers to the opposite sides of the common electrolyte wall therebetween only at spaced point-like contact areas, where the previously mentioned line-like contact areas cross one another. The inert support material comprises between 2 and 98 wt.% of the whole core, varied as needed to minimize differential thermal expansion of the composite core wall structures.

DETAILED DESCRIPTION OF THE INVENTION

Figure 1:
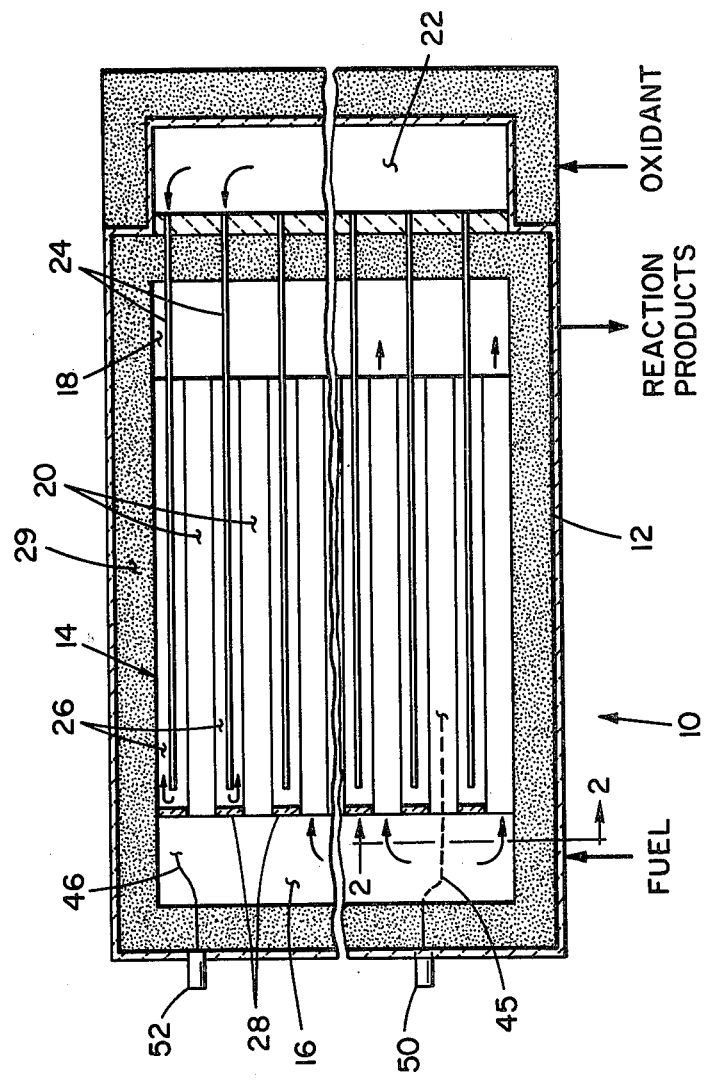
FIG. 1 is a side elevational sectional view of a fuel cell formed according to a preferred embodiment of the invention, the illustration being somewhat schematically for clarity of disclosure.

FIG. 1 illustrates one embodiment of a fuel cell 10, which has a housing 12 within which a honeycomb core 14 is located. The housing is fluid tight defining an inlet manifold 16 for fuel and an outlet manifold 18 for the reaction products, the manifolds 16 and 18 communicating with one another via fuel passageways 20 formed in the core 14. Further, an inlet manifold 22 for oxidant is located adjacent the housing 12 and feed tubes 24 from the manifold 22 direct the oxidant into passageways 26 formed in the core. The passageways 26 are closed by end caps 28 adjacent the fuel manifold 16, but are open to the outlet manifold 18. The fuel passageways 20 and the oxidant passageways 26 are disposed parallel to one another, and are located alternately adjacent one another within the core 14. The annular space between the core 14 and the housing 12 is packed as at 29 with a ceramic powder or the like to minimize leakage of the gases between the fuel and outlet manifolds 16 and 18.

Figure 2:
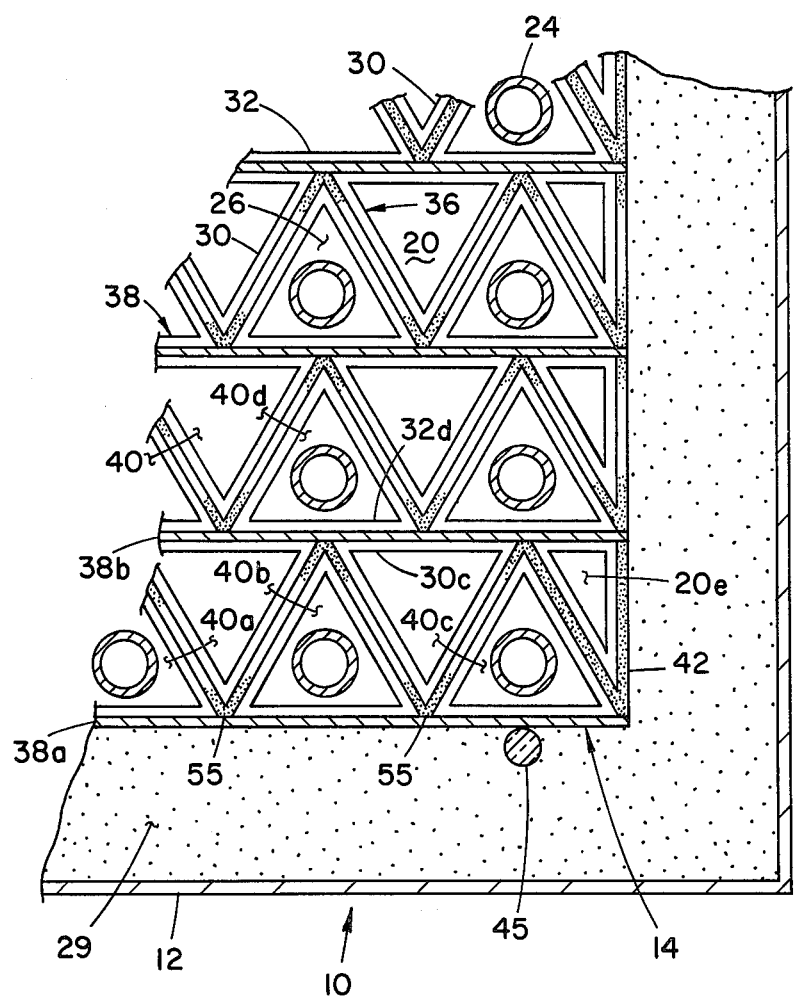
FIG. 2 is an enlarged sectional view as seen generally from line 2—2 in FIG. 1, illustrating in greater detail the construction of the invention.

FIG. 2 illustrates in enlarged cross section a preferred embodiment of the core 14 for the fuel cell 10 of FIG. 1. The passageways 20 for the fuel are formed with only anode material 30 defining the exposed passageways walls; while the passageways 26 for the oxidant are formed with only cathode material 32 defining the exposed passageways walls. Adjacent cell passageways 20 and 26 further basically are separated by either or both an electrolyte wall portion 36 and by an interconnect wall portion 38. The electrolyte wall portion 36 provides a thin layer of electrolyte material 37 between the anode material 30 and the cathode material 32. The interconnect wall portion provides a thin layer of interconnect material 39 between the anode and cathode materials 30 and 32.

Gaseous fuel would be conveyed from a source (not shown) to the manifold 16 for flow through the passageways 20 in the core 14 toward the outlet manifold 18. Likewise, oxidant would be carried from a source (not shown) to the manifold 22 for flow via the tubes 24 into the passageways 26 at locations adjacent the fuel manifold 16, and in turn for flow axially through the passageways toward the outlet manifold 18. The fuel and oxidant, admitted to the core at the purities and flow rates required, would react electrochemically across the electrolyte walls 36 separating the fuel and oxidant in the core. Fuel and oxidant not consumed in the core would react or combine by combustion within the outlet manifold 18 and subsequently be discharged with the other reaction products from the fuel cell.

It would be desirable to provide a slight reduction in cross sectional area at the discharge end of the fuel passageways so that unconsumed fuel from the fuel passageway would then be jetted into the outlet manifold where its reaction with the oxidant therein would occur in effect as jets of flame. This restricted outlet would also minimize the possibility of oxidant back flowing into the fuel passageway from the outlet manifold, which would then induce direct fuel-oxidant reaction internally of the anode passageway. Generally, the pressure differential between the fuel and reaction products manifolds 16 and 18 is quite low, and the velocity of the gases within or through the passageways 20 and 26 is likewise quite low.

It would be appreciated that each electrolyte wall 36, comprised of the electrolyte 37 sandwiched between the anode 30 and the cathode 32, electrochemically combines the fuel and oxidant being conveyed in the passageways 20 and 26, respectively, to develop an electrical potential across the electrolyte. This thereby defines a "cell" 40 in the overall fuel cell 10. Further, for all of the electrolyte walls thus confined between any pair of adjacent interconnect walls (38a and 38b, for example), there is an in-parallel electrical hookup of these cells (40a, 40b, for example). On the other hand, each interconnect wall (38b, for example) disposed between the separate cells above and below it (cells 40c and 40d, for example) electrically connects the cathode of one cell with the anode of the adjacent cell (cathode 32d with anode 30c, for example). This provides for an in-series hookup of the cells (40c and 40d, for example) on the opposite sides of the interconnect wall 38b. The electrolyte walls 36 are alternated or backfolded in effect between the interconnect walls 38 so that the fuel and oxidant passageways 20 and 26 are likewise alternately disposed between any pair of adjacent interconnect walls. At the side edge of the core, a neutral wall 42 will typically be used to define the boundary for the end fuel passageway 20e, the neutral wall having only the anode material and the electrolyte extended between the adjacent interconnect walls 38a, 38b, for example.

As will be appreciated, the anode 30 and cathode 32 in electrolyte walls 36 are porous to the degree required to allow the fuel and oxidant gases confined on the opposite sides thereof to electrochemically combine, while the electrolyte 37 and interconnect 38 are impervious and serve to isolate the fuel and oxidant gases completely from one another. Likewise, the electrolyte walls 36 are electrically not conductive as between the cathode and anode formed on opposite sides of the electrolyte, but the electrolyte does provide ionic conductivity; and moreover both the cathode and anode are electrically conductive. On the other hand, the interconnect walls electrically connects the anode and cathode of the cells on opposite sides of the wall in series with one another.

In a practical fuel cell of the type shown in FIGS. 1 and 2, many serially connected cells 40c, 40d, etc. will be provided, exceeding perhaps even fifty. The outermost interconnects (or adjacent cathode or anode) of the series connections are connected electrically via conductors 45 and 46 (illustrated schematically in FIG. 1 and 2) to external terminals 50 and 52 of the fuel cell to provide a cumulative electrical output at the terminals. The conductors 45 and 46 may be connected to the lowermost anode or overlying interconnect material 39L, and the uppermost cathode or interconnect material (not shown). In this manner, the overall fuel cell voltage at the exterior terminals 50 and 52 might be of the order of between twenty and five hundred volts. As the conductors 45, 46 will typically be formed of a high temperature conductive metal, it will be advantageous to have the conductors in a fuel environment (rather than an oxidating environment) or to bleed a small amount of fuel over the conductors so as to minimize their oxidation.

Of interest to this invention is the fact that the fuel cell core 14 is formed as a monolithic or rigid array of cells 40, and further that the core is formed solely or exclusively of the active anode, cathode, electrolyte and interconnect materials 30, 32, 37 and 39, respectively. In other words, no nonactive material is otherwise used in the fuel cell core 14 for support of the passageways 20 and 26. Each active material is in the form of an thin layer, and the layers are integrally bonded or fused together to form the monolithic core 14.

In the disclosed core 14, the core walls 36 and 38 (and 42) immediately adjacent and defining the fuel and oxidant passageways 20 and 26 are quite short or of small spans to provide that the passageways themselves are of small cross section (perhaps only several square millimeters). Because of the small wall spans, the thin layered materials each totaling only fractions of a millimeter in thickness will yet be structurally sufficient to support the core and any gas and/or reaction pressure loads required.

The embodiment of a monolithic core 14 illustrated in FIG. 2 provides a fuel and oxidant passageway containment that has a very effective ratio of the area of the electrolyte walls 36 to the interconnect walls 38 (or as a percentage of the cross sectional area of the cell passageways) to produce a high current producing density. The electrolyte walls 36 are angled alternately or backfolded on one another between the adjacent parallel pairs of interconnect walls 38 to define alternately inverted triangularly shaped fuel passageways 20 and oxidant passageways 26 between the interconnect walls, where the passageways 20 and 26 extend in side by side parallel relation to one another. In the illustrated embodiment, both the interconnect walls 38 and the electrolyte walls 36 are basically flat or planar, the electrolyte walls of each passageway being angled and meeting the interconnect walls 38 at corner junctures 55 generally disposed along and spaced apart on any one interconnect wall. The percentage of active electrolyte wall surface area interposed between each fuel passageway 20 and oxidant passageway 26 is quite high, compared to the area of the passageways. Moreover, the triangularly arranged passageways provide a compact design. Again, the core is formed only of the active anode, cathode, electrolyte, and interconnect materials, each as very thin layers, and no nonactive materials are present for support.

Figure 3:
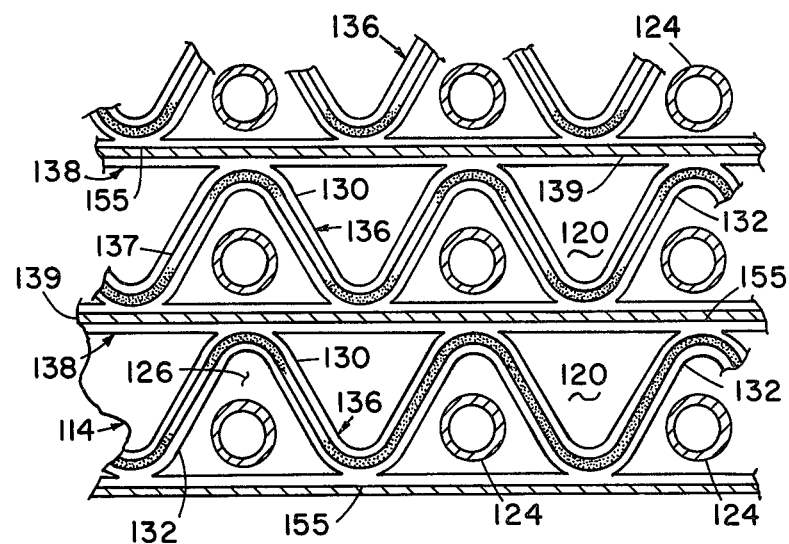
FIGS. 3, 4, 5 and 6 are sectional views similar to FIG. 2, except showing alternate embodiments of the subject invention.

FIG. 3 illustrates an alternate configuration of core 114 where the electrolyte walls 136 are wavy, possibly as a sinusoidal wave or other repeating shape, and extend between corresponding pairs of generally flat and parallel interconnect walls 138. The electrolyte walls nonetheless are alternated or backfolded so that fuel passageways 120 and oxidant passageways 126 are likewise defined with only anode material 130 or cathode material 132 exposed and are alternately arranged between the interconnect walls 138. Each electrolyte wall 136 thus includes anode material 130 and cathode material 132 sandwiching electrolyte material 137, and each interconnect wall includes the anode material 130 and cathode material 132 sandwiching the interconnect material 139. The oxidant feed tube 124 extends within the oxidant passageway 126.

Figure 4:
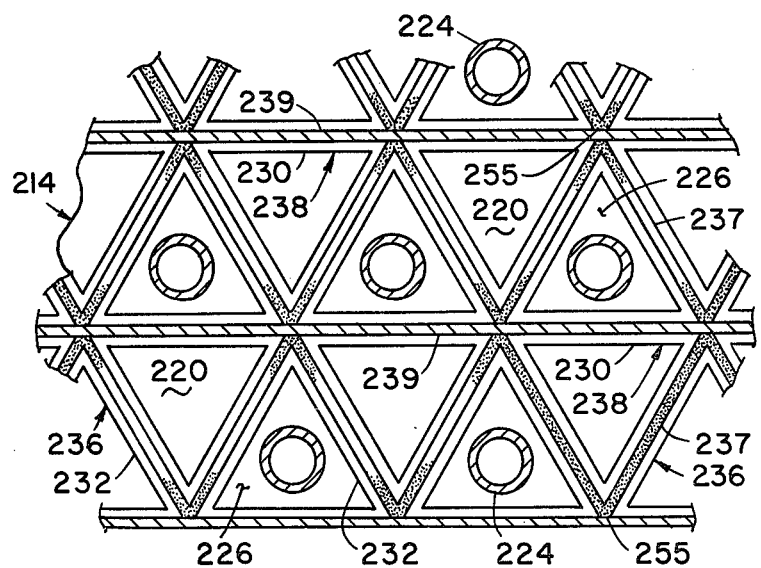

As can be seen in both FIGS. 2 and 3, the preferred core will provide a repeating regularity of cell arrangement, in the form of a honeycomb. In each embodiment 14 and 114, the junctures 55 (and 155) between the electrolyte walls 36 (and 136) and the interconnect walls 38 (and 138) are staggered or laterally offset relative to one another. One advantage of this arrangement is that it provides ample area of the interconnect wall (38d, for example) between the serially connected cathode 32d and anode 30c of the adjacent cells 40d and 40c, respectively, tending to reduce high current densities where all the current crosses the interconnect material. However, one disadvantage is that the junctures 55 (and 155) at the midpoint of the interconnect wall mechanically tends to bend or strains the wall merely because of the weight of the various serially stacked cells on one another. To overcome this, the core 214 (FIG. 4) is formed where the fuel-oxidant flow passageways 220 and 226 are alternately arranged but where the junctures 255 line up opposite one another. The electrolyte walls 236 still are alternately backfolded between and are angled relative to the interconnect walls 238. Moreover, each electrolyte wall 236 has the anode 230 and cathode 232 sandwiching the electrolyte 237, and each interconnect wall 238 has the anode 230 and cathode 232 sandwiching the interconnect 239. Also, the oxidant feed tube 224 fits within each oxidant passageway 226.

However, the shapes and arrangements of the electrolyte and interconnect walls are somewhat immaterial, other than for providing even greater density outputs of electrical power which, of course, is important; but the preference in design may be dictated somewhat in the manner of forming the core, as will be discussed later. Thus, the interconnect walls (38, 136 or 236) need not be substantially parallel but can be angled or stepped wavy, and the electrolyte walls could be made angled or stepped or substantially parallel to one another to produce a diamond-like configuration or a hexagonal-like configuration (neither being shown).

Under one preferred embodiment, a power cell formed according to this invention and approximately 1 m wide by 1 m high could have as many as 10,000–15,000 separate core passageways, each of relatively small cross section, perhaps only several square mm. An electrolyte wall 36 (and 136 or 236) might be formed with the electrolyte 37 (and 137 or 237), the anode 30 (and 130 or 230) and the cathode 32 (and 132 or 232) each of very thin layers. Thus, electrolyte might be in the range between 0.002 and 0.01 cm in the thickness and preferably between 0.002 and 0.005 cm in thickness; while the anode and cathode might be in the range between 0.002 and 0.05 cm in thickness and preferably between 0.005 and 0.02 cm in thickness. The composite electrolyte wall might therefore be in the range between 0.006 and 0.11 cm in thickness and preferably between 0.012 and 0.045 cm in thickness. The interconnect 38 (and 138 or 238) walls can also be of corresponding thickness, where the anode and cathode would be of corresponding thickness as in the electrolyte walls, and the interconnect 39 (and 139 or 239) would be of corresponding thickness as the electrolyte 37 (and 137 or 237). The monolithic core construction is believed to provide sufficient structural integrity and stability even with these wall thicknesses, and at a low cost and with high volume power density. This would be enhanced because of the fact that no nonactive support structure is used to hold the cell walls rigid.

The fuel cell core 14 (and 114 or 214) can be formed by several known techniques. Thus the separate materials might be extruded in pliant form as thin layers and the layers might be lapped on one another. This could be done in approximate final core shapes, such as by extruding in the same direction as the core passageways are extended. Alternately, the extrusions could be of partially semi-final core shapes that must be stacked on one another. Also, the cathode and anode as layers might be extruded, and the thinner layers of the electrolyte or the interconnect might be tape cast and then lapped onto the cathodes and anodes. The thin layers may in fact be screen printed on one another. Also, the anode, cathode, electrolyte or interconnect layer might be formed of a paste, a slurry or an ink, and would therefore be layered out to the thickness needed as previously mentioned. In the region where breaks or gaps in the layer must exist, such as to eliminate inner cell shorting while yet having the anode and cathode connected in series across the interconnect wall, the same can be done by a printing technique or masking. The composite layers might be formed flat, so that while yet pliant could then be mechanically shaped or formed, and then stacked on one another. Ultimately, the formed and shaped wall structures would be sintered or otherwise heat cured in an oven or the like (not shown) whereby they would become self supporting and dimensionally stable.

Figure 5A:
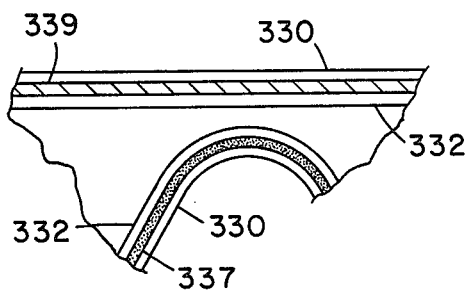
FIGS. 5a, 6a and 6b, are partial sectional views of the material layers forming the fuel cells of FIGS. 5 and 6, respectively, showing the layers in different sequences of fabrication.
Figure 5:
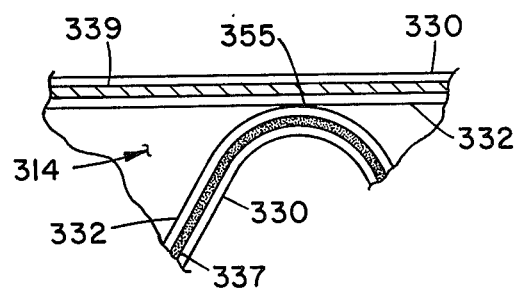
Figure 6A:
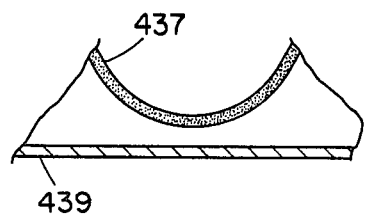
Figure 6B:
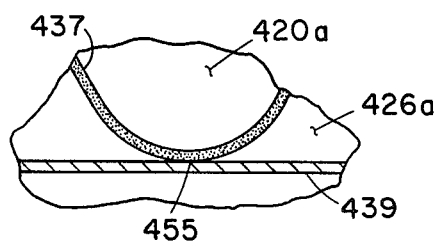
Figure 6:
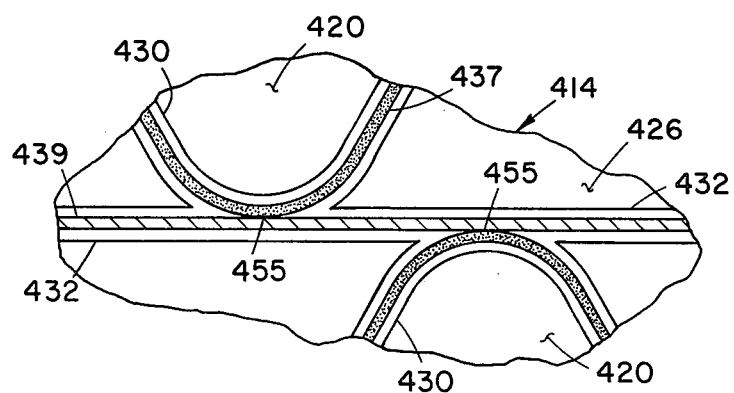

FIGS. 5a and 5 illustrate trilayer formation of active materials for both the electrolyte wall 336 and the interconnect wall 338, where the composite layer can be shaped to contact one another (see FIG. 5) and assume the three dimensional shape of the core 314. The anode 330 and cathode 332 materials thus lap one another at the meeting junctions 355, forming a double thick layer between the electrolyte 337 and the interconnect 339. However, as neither the cathode nor the anode materials, in general, are as structural as the interconnect and/or the electrolyte, the embodiments of FIGS. 6a, 6b and 6c may be preferred. Thus, it may be preferred to use only the interconnect 439 and electrolyte 437 materials to form the core shape so that they are in direct contact with one another at the junctions 455 between the walls, and to add subsequently the cathode 432 and anode 430 materials to the formed core shape. This could be done by deposition of the material with a carrier gas or solvent and/or by back washing such a mixture within the defined core channels 420a and 426a (FIG. 5b) to form the flow passageways 420 and 426 (FIG. 5). Thereafter, the solvent is evaporated to leave behind the thin layer of the anode and/or cathode materials; and further the composite core is sintered to provide dimensional stability and strength.

The anode, cathode, electrolyte and interconnect materials for the layers would be matched as closely as possible to one another with respect to each coefficient of thermal expansion so as to minimize separation problems due to differential thermal expansion. The fact the material layers are extremely thin will tend to reduce this problem. Also, the fusing of the cathode and anode materials when lapped against either the electrolyte or interconnect materials, or in fact against itself as across a juncture between the electrode and interconnect walls, tends to hold the core array rigid. Fusing can be accomplished as noted by sintering the pliant layered materials together which again would render the core array rigid and dimensionally stable.

The monolithic fuel cell cores 14, etc., will be significantly lighter compared to fuel cell constructions having nonactive material supports upon which the active fuel cell materials are layered. Moreover, the monolithic core walls, including only active materials, can be very thin (a millimeter thick or less) with the individual electrolyte, cathode, anode or interconnect layers being proportionally thinner. Further, many discrete passageways for fuel and oxidant can be established of small cross sections of only several square millimeters, which provide for increased ratios of the active electrolyte wall area to the confined passageway volume, when compared to more conventional core constructions having nonactive material support tubes. The small fuel and oxidant gas passageways have only short wall spans so that the thin core walls are of sufficient strength to withstand the gas pressures and mechanical strains. The short wall spans, moreover, reduce the required length of the current flow path to minimize the resistant losses. This reduced current path resistance will provide an anticipated smaller voltage drops and increased efficiency with the monolithic core. The volumetric power and energy density efficiencies for the monolithic fuel cell core should be increased substantially compared against those of the nonactive material support tube core constructions, and the dramatic increases are possible because virtually all of the core weight involves only the active fuel cell materials, and no nonactive support tube materials.

A typical cathode typically would be lanthanum manganite ($LaMnO_3$); the electrolyte would comprised of yttria-stabilized zirconia ($ZrO_2 + Y_2O_3$); and the anode would be a cobalt yttria-stabilized zirconia cermet or mixture ($Co + ZrO_2Y_2O_3$). The interconnect might be comprised for example, of lanthanum chromite ($LaCrO_3$), where the lanthanum manganite ($LaMnO_3$) and lanthanum chromite ($LaCrO_3$) are suitably doped to obtain electrical conductivity.

The embodiments of the invention in which an exclusive property or privilege is claimed are defined as follows:

1. A fuel cell for electrochemically combining fuel and oxidant for generation of galvanic output, comprising the combination of a core having an array of electrolyte and interconnect walls, each electrolyte wall consisting of thin layers of cathode and anode materials respectively, sandwiching a thin layer of electrolyte material therebetween, each interconnect wall consisting of thin layers of the cathode and anode, respectively sandwiching a thin layer of interconnect material therebetween, whereby separate sections of said electrolyte wall are arranged between separate sections of adjacent interconnect walls operable to define a plurality of core passageways alternately arranged respectively where the inside faces thereof are formed either of only the anode material or of only the cathode material, each core passageway having the anode material on the inside being for the fuel and each core passageway having the cathode material on the inside being for the oxidant, means to direct the fuel and the oxidant for flow through the respective anode and cathode passageway, means to direct the galvanic output from the anode and cathode materials to an exterior circuit, and the electrolyte and interconnect walls being substantially devoid of any composite inert material and the core being monolithic.

2. An electrochemical fuel cell according to claim 1, wherein said cathode is lanthanum manganite ($LaMnO_3$); said anode is cobalt yttria-stabilized zirconia cermet or mixture ($Co + ZrO_3Y_2O_3$); said electrolyte is yttria-stabilized zirconia ($ZrO_2 + Y_2O_3$); and said interconnect is lanthanum chromite ($LaCrO_3$), the lanthanum manganite and lanthanum chromite being suitably doped to obtain electrical conductivity.

3. An electrochemical fuel cell according to claim 1, wherein the interconnect walls are somewhat planar and are disposed substantially parallel to one another.

4. An electrochemical fuel cell according to claim 3, wherein said electrolyte walls defining said passageways are generally planar and are angled relative to one another and relative to the interconnect walls, whereby the defined flow passageways are shaped in cross section somewhat as alternately inverted triangles.

5. An electrochemical fuel cell according to claim 4, wherein said cathode is lanthanum manganite ($LaMnO_3$); said anode is cobalt yttria-stabilized zirconia cermet or mixture ($Co + ZrO_3Y_2O_3$); said electrolyte is yttriastabilized zirconia ($ZrO_2 + Y_2O_3$); and said interconnect is lanthanum chromite ($LaCrO_3$), the lanthanum manganite and lanthanum chromite being suitably doped to obtain electrical conductivity.

6. An electrochemical fuel cell according to claim 4, wherein the electrolyte and interconnect walls meet one another at junctures and wherein the junctures are spaced from and laterally offset from one another.

7. An electrochemical fuel cell according to claim 6, wherein each layer of the electrolyte and interconnect materials is of the order of 0.002–0.01 cm thick, and wherein each layer of the electrolyte and interconnect materials is of the order of 0.002–0.01 cm thick.

8. An electrochemical fuel cell according to claim 4, wherein the electrolyte and interconnect walls meet one another at junctures and wherein the junctures are paired opposite one another.

9. An electrochemical fuel cell according to claim 8, wherein each layer of the electrolyte and interconnect materials is of the order of 0.002–0.01 cm thick, and wherein each layer of the electrolyte and interconnect materials is of the order of 0.002–0.01 cm thick.

10. An electrochemical fuel cell according to claim 3, wherein said electrolyte walls defining said passageways are wavy and extended between adjacent pairs of interconnect walls.

11. An electrochemical fuel cell according to claim 10, wherein the wavy electrolyte walls are generally in the form of sinusoidally shaped waves.

12. An electrochemical fuel cell according to claim 1, wherein the cells defined between any adjacent pairs of interconnect walls generate electrical potential in parallel with one another, and wherein the cells defined on opposite sides of any interconnect wall generate electrical potential in series with one another.

13. An electrochemical fuel cell according to claim 1, wherein each layer of the electrolyte and interconnect materials is of the order of 0.002–0.01 cm thick.

14. An electrochemical fuel cell according to claim 1, wherein each layer of the cathode and anode materials is of the order of 0.002–0.05 cm thick.

15. An electrochemical fuel cell according to claim 1, wherein each electrolyte wall is of the order of 0.006–0.11 cm thick.

16. An electrochemical fuel cell according to claim 1, wherein each interconnect wall is of the order of 0.006–0.11 cm thick.

17. An electrochemical fuel cell according to claim 1, wherein the electrolyte and interconnect walls meet one another at junctures and wherein the junctures are spaced from and laterally offset from one another.

18. An electrochemical fuel cell according to claim 1, wherein the electrolyte and interconnect walls meet one another at junctures and wherein the junctures are paired opposite one another.

* * * * *